ized cashew nut shell liquid resin with a reactive diluent and high surface area inorganic fillers, and thereafter adding other fillers and reinforcing fibers.

United States Patent [19]
Christie

[11] Patent Number: 5,132,065
[45] Date of Patent: Jul. 21, 1992

[54] METHOD FOR PRODUCING FRICTION COMPOSITIONS AND PRODUCTS

[75] Inventor: C. Dale Christie, Naperville, Ill.

[73] Assignee: Amsted Industries, Inc., Chicago, Ill.

[21] Appl. No.: 690,286

[22] Filed: Apr. 24, 1991

[51] Int. Cl.⁵ .................. B29B 7/90; B29B 11/16; B29C 43/18; B29L 31/16

[52] U.S. Cl. .................. 264/122; 264/236; 264/259; 264/319; 264/347; 264/349; 523/156; 523/158

[58] Field of Search .............. 264/109, 118, 122, 123, 264/236, 349, 347, 319, 259; 523/156, 158

[56] References Cited

U.S. PATENT DOCUMENTS

| | | | |
|---|---|---|---|
| 2,078,617 | 4/1937 | Spokes | 264/109 |
| 3,334,163 | 8/1967 | Gilbert | 264/122 |
| 3,505,446 | 4/1970 | Griffith | 264/122 |
| 3,647,722 | 3/1972 | Albertson et al. | 264/122 |
| 4,169,680 | 10/1979 | Littlefield . | |
| 4,219,452 | 8/1980 | Littlefield . | |
| 4,313,869 | 2/1982 | Littlefield . | |
| 4,432,922 | 2/1984 | Kaufman et al. | 264/122 |
| 4,466,513 | 8/1984 | Dedek . | |

*Primary Examiner*—Jeffery Thurlow
*Assistant Examiner*—Mathieu Vargot
*Attorney, Agent, or Firm*—Edward J. Brosius; F. S. Gregorczyk

[57] ABSTRACT

A railroad brake shoe friction composition is prepared in the absence of a volatile solvent by first preparing a fluid paste bonding matrix containing an uncured rubber compound, a blend of highly polymerized cashew nut shell liquid resin with a reactive diluent and high surface area inorganic fillers, and thereafter adding other fillers and reinforcing fibers.

9 Claims, No Drawings

METHOD FOR PRODUCING FRICTION COMPOSITIONS AND PRODUCTS

FIELD OF THE INVENTION

This invention relates to the production of friction brake shoe compositions and more particularly to the production of railroad brake shoes without the use of any volatile solvent.

BACKGROUND OF THE INVENTION

The friction composition for railroad brake shoes usually contains four functional groups of ingredients, namely bonding materials, organic and carbon based fillers, inorganic fillers and reinforcing fibers including synthetic and natural organic fibers. The bonding materials provide a curable matrix to hold a uniform dispersion of the fillers and reinforcing fibers and usually comprise both a vulcanizable natural or synthetic rubber and a thermosetting resin of natural or synthetic source. Typically the rubber component has been butyl rubber, a styrene butadiene copolymer rubber, an acrylonitrile rubber, a chlorinated butyl rubber, or mixtures thereof, along with a curing agent such as sulfur or 2-mercaptobenzothiazole, tetramethylthiuram disulfide and may also include minor amounts of stiffening agents such as carbon black, magnesium oxide and zinc oxide. Normally the thermosetting resin has been a phenol-aldehyde resin or cashew nut shell oil partially polymerized with an aldehyde, and mixtures thereof. If the resin component is not self-curing, an independent curing agent such as hexamethylene-tetramine is included in the bonding matrix.

Suitable organic and carbon based fillers have included petroleum coke, coal, graphite (both natural and synthetic), neoprene scrap and fully cured cashew nut resin. The purpose of such organic and carbon based fillers is to provide bulk to the final composition and to control friction at elevated operating (braking) temperatures.

Inorganic fillers function to largely supply the frictional coefficient of the final composition and to absorb frictional heat during braking and typically have included iron grit, iron powder, red iron oxide, sand, aluminum silicate (kyanite), barytes, rottenstone, clay, aluminum trihydrate, magnesium oxide and zinc oxide.

The reinforcing fibers serve to provide tensile strength and shear resistance in the final composition. Historically, asbestos was favored as a natural reinforcing fiber. Other natural fiber sources are wollastonite (calcium silicate) and mica. Manufactured fibers include glass fibers, steel wool, alumna-silica ceramic fibers and most recently favored aramid polymer fiber and acrylic fibers.

Examples of prior railroad brake shoe production and the ingredients and methods therefore are disclosed in U.S. Pat. Nos. 4,169,680, 4,219,452, 4,313,869 and 4,466,513 the details of which are included herein by reference.

Heretofore it has been necessary to dilute the bonding materials with a volatile solvent such as toluene so as to provide sufficient fluidity to enable the additional ingredients to be wetted and dispersed therein and to permit introduction of fragile reinforcing fibers without destroying or damaging the structure thereof. Subsequently, the solvent was driven out of the composition by vacuum heating. The need for such a solvent has been a disadvantage for a number of reasons including the cost of the solvent and equipment to recover and recycle same. Moreover, it has been nearly impossible to prevent loss of some solvent with attendant environmental and employee health concerns.

SUMMARY OF THE PRESENT INVENTION

Accordingly, it is a principal object of the present invention to provide a method for mixing the ingredients of a railroad brake shoe composition without employing a volatile solvent.

It is another object of the present invention to provide a method for mixing the ingredients of a railroad brake shoe composition without damage to friable reinforcing fibers but in the absence of evaporable diluent.

It is yet another object of the present invention to provide a method for mixing the ingredients of a railroad brake shoe composition wherein the bonding ingredients are made sufficiently fluid for the dispersion of filler and reinforcing ingredients without the use of a diluent solvent.

It is still another object of the present invention to provide an improved method for producing a railroad brake shoe.

In general, the present invention involves the fluidizing of a friction material bonding matrix by combining a blend of highly polymerized cashew nut shell liquid resin and a minor amount of a reactive diluent, such as acid treated raw cashew nut oil, furfural alcohol resin or liquid phenolic resin, with a quantity of an uncured rubber compound, and mechanically shearing (mixing) the bonding matrix in the presence of high surface area inorganic fillers. Upon the mixture reaching the consistency of a paste that is sufficiently fluid to permit introduction of friable material without damage all of the additional ingredients, i.e. organic and inorganic fillers and reinforcing fibers, in the absence of any diluent solvent, are added and mixing continued without degrading their required morphology and until the latter are uniformly dispersed in the bonding matrix. Thereafter the resulting composition is shaped, cured and adhered to a brake shoe backing plate.

DETAILED DESCRIPTION OF THE INVENTION AND A PREFERRED EMBODIMENT

In the preparation of a suitable friction composition, a bonding matrix of rubber and resin is first produced in a high shear mechanical mixer such as a sigma blade type double-arm mixer such as is available from Baker-Perkins Inc. of New York, N.Y. Selected quantities of both subdivided unvulcanized rubber, preferably crumbled, and a special blend of uncured highly polymerized cashew nut oil resin with 10-30%, by blend weight, of a reactive diluent such as acid treated raw cashew nut oil, furfural alcohol resin or liquid phenolic resin are placed in the mixer along with minor functionally sufficient quantities of rubber vulcanizing and resin curing agents, preferably sulfur and hexamethylene-tetramine, respectively. Added to the foregoing ingredients are quantities of inorganic fillers having relatively high surface to weight ratios, such fillers and quantities being selected to give desired known properties to the final friction composition. In the preferred bonding matrix, these fillers may include powdered clay, baryte, alumina trihydrate, rottenstone, magnesium oxide and red iron oxide dust. Carbon black may also be included. These high surface area fillers are found to have absorptive and abrasive qualities that enhance the shearing action of the mixer and thereby promote the rapid production of a uniform rubber-resin fluid paste within about two (2) to ten (10) and preferably about four (4) minutes of high shear mixing time. The point at which the paste-like, but sufficiently fluid to accept friable material, consistency is achieved is more precisely indicated by the time following start-up at which the electric current (amperage) drawn by the mixer motor begins to decline after first peaking.

Thereafter, the remaining friction composition ingredients comprising all remaining fillers, reinforcing fibers, vulcanizing and curing agents are added to the bonding paste and mixing is continued without damaging fiber morphology for about an additional twenty (20) minutes or until a uniform dispersion of fillers and fibers throughout the bonding media is achieved. As heretofore indicated, the vulcanizing and curing agents are usually introduced into the composition along with the rubber and resin ingredients and stiffening agents.

After the mixing is completed, the friction composition is further processed in a manner similar to prior procedures for producing friction shoes and the like. Normally this will entail shaping and pressing quantities of the friction composition into pre-forms of required shape and then molding and heating the shaped composition, under pressure, to cure and harden the rubber-resin matrix. These procedures may include pre-reduction of the friction composition in a hammer mill, or the like, to produce uniform size particles to facilitate handling and the charging of measured quantities of the composition into pre-form cavities.

For the production of railroad friction shoes, where the friction composition is bonded to an arcuate steel backing member, the friction composition will typically be pre-formed into a briquette having an arcuate shape and the requisite weight desired for the brake shoe; and the briquette is subsequently assembled with a steel backing plate within a mold-press where it held at about 2500 psi and about 350° F. for a period of about twenty minutes (20) which is sufficient to vulcanize and cure the rubber-resin matrix and bond same to the backing plate.

EXAMPLES 1-10

The following tabulation of examples show a variety of railroad friction brake compositions with ingredients by weight percentage of each entire composition. Among these raw cashew nutshell oil is a preferred reactive diluent and Example 3 represents a preferred composition. Each composition of the examples is prepared in accordance with the aforedescribed procedure. It is to be noted that in each example the blend of polymerized liquid cashew resin and reactive diluent (either raw cashew nutshell oil, furfural alcohol resin or liquid phenolic resin) includes an amount of reactive diluent that is about 10% to 30% of the two combined ingredients.

| INGREDIENTS | EXAMPLES (Percentage of Total Composition Weight) | | | | | | | | | |
|---|---|---|---|---|---|---|---|---|---|---|
| | 1 | 2 | 3 | 4 | 5 | 6 | 7 | 8 | 9 | 10 |
| Bonding Materials: | | | | | | | | | | |
| Polymerized Liquid Cashew Resin | 11.3 | 8.7 | 10.0 | 10.0 | 9.6 | 10.0 | 9.6 | 10.0 | 11.3 | 8.7 |
| Reactive diluent: | | | | | | | | | | |
| Raw Cashew Nut Oil | 1.2 | 3.8 | 2.5 | — | — | 2.5 | 2.4 | — | 1.2 | 3.8 |
| Furfural Alcohol Resin | — | — | — | 2.5 | — | — | — | 2.5 | — | — |
| Liquid Phenolic Resin | — | — | — | — | 2.4 | — | — | — | — | — |
| Styrene-Butadiene Rubber | 10.0 | 7.6 | 8.8 | 8.2 | 7.6 | 8.8 | 7.6 | 8.2 | 8.8 | 8.8 |
| Hexamethylene Tetramine | .6 | .8 | .7 | .7 | .8 | .7 | .8 | .7 | .6 | .8 |
| Sulfur/Accelerating Agents | 2.4 | 1.8 | 2.1 | 2.0 | 1.8 | 2.1 | 1.8 | 2.0 | 2.1 | 2.1 |
| Zinc Oxide | .6 | .4 | .5 | .5 | .4 | .5 | .4 | .5 | .5 | .5 |
| Carbon Black | 3.2 | 3.8 | 4.4 | 4.1 | 3.8 | 2.6 | 3.8 | 4.1 | — | — |
| Carbon Based Fillers: | | | | | | | | | | |
| Graphite | — | — | — | — | — | — | — | 4.0 | 8.0 | — |
| Petroleum Coke | 18.0 | 18.0 | 18.0 | 18.0 | 18.0 | 15.0 | 15.0 | 13.0 | 15.0 | 13.3 |
| Cured Resin | — | — | — | — | 3.0 | 3.0 | 5.0 | 2.0 | 3.5 | 6.0 |
| Inorganic Fillers: | | | | | | | | | | |
| Red Iron Oxide | 19.7 | 21.1 | 20.0 | 20.0 | 19.6 | — | 20.0 | 15.5 | — | 18.0 |
| Iron Grit | — | — | — | — | — | 18.0 | — | — | 15.0 | — |
| Clay | 20.0 | 21.0 | 20.0 | 21.0 | 20.0 | — | — | 20.0 | 16.0 | 21.0 |
| Barytes | — | — | — | — | — | — | 17.1 | — | — | — |
| Alumina Thihydrate | — | — | — | — | — | 20.3 | — | — | — | — |
| Calcined Kyanite | 10.0 | 10.0 | 10.0 | 10.0 | 10.0 | 12.0 | 12.0 | 14.0 | 15.0 | 13.0 |
| Reinforcing Fibers: | | | | | | | | | | |
| Chopped Fiberglass | 2.5 | 2.5 | 2.5 | 2.5 | 2.5 | 3.5 | 3.0 | 2.5 | 2.5 | 3.0 |
| Kevlar ® Pulp (Aramid Fiber) | — | — | — | — | — | 1.0 | 1.5 | — | — | — |
| Acryllic Fiber | .5 | .5 | .5 | .5 | .5 | — | — | 1.0 | .5 | 1.0 |

Another friction composition for railroad brake shoes comprises the following ingredients:

| Ingredient | Specific Gravity | Weight % | Volume % |
|---|---|---|---|
| Bonding Materials: | | | |
| Blend of Polymerized Cashew Nut Oil Resin with 20% Acid Treated Raw Cashew Nut Oil | 1.03 | 16.77 | 30.44 |
| Styrene Butadiene Rubber Crumbs | 1.00 | 7.74 | 14.47 |
| Sulfur | 2.07 | 1.66 | 1.50 |
| Hexamethylene Tetramine | 1.30 | .84 | 1.21 |
| Zinc Oxide | 5.60 | .37 | .12 |
| Clay | 2.45 | 18.79 | 14.34 |
| Red Iron Oxide | 5.18 | 15.52 | 5.60 |
| Carbon Black | 1.75 | 3.55 | 3.79 |
| Additional Fillers: | | | |
| Kyanite ($3AL_2O_3$—$S_1O_2$) | 3.00 | 12.95 | 8.07 |
| Petroleum Coke Fines | 1.93 | 13.62 | 13.19 |
| Graphite | 2.30 | 4.43 | 3.60 |

-continued

| Ingredient | Specific Gravity | Weight % | Volume % |
|---|---|---|---|
| Reinforcing Fibers: | | | |
| Chopped Fiberglass (rubber impregnated) | 2.20 | 2.72 | 2.31 |
| KEVLAR ® (aramid fiber) Pulp | 1.44 | 1.05 | 1.36 |

The foregoing detailed description has been given for clearness of understanding and to provide a complete description of a preferred embodiment of the invention. Various modifications may be made without departing from the spirit and scope of the invention which is defined in the following claims.

What is claimed is:

1. A method for manufacturing a friction composition material for railroad brake shoes, said composition material having a bonding matrix of bonding materials with fillers and reinforcing fibers dispersed uniformly therein, said method comprising:

providing at least one inorganic filler with first surface areas, a first quantity of a blend of a non-volatile-bearing reactive diluent and an uncured highly polymerized cashew nut oil resin, which reactive diluent is between about 10% to 30% by weight of said first quantity, a functional amount of a resin curing agent and, a second and lesser quantity of styrene butadiene rubber crumbs along with a functional amount of a vulcanizing agent for said rubber;

mixing initially said first and second quantities in the presence of said at least one first surface area filler ingredient to form a fluid paste with a consistency to accept dispersion of said fillers and fibers without damage to the structures thereof;

providing at least one filler with second surface areas less than said one inorganic filler first surface areas;

then adding said at least one second surface area filler and reinforcing fibers to said fluid paste;

continuing the mixing of said fluid paste, fillers and reinforcing fibers to form a uniform dispersion, said reactive diluent operable to provide sufficient fluidity to said fluid paste for wetting of said fibers and fillers.

2. The method of claim 1, wherein said reactive diluent is selected from the group consisting of acid-treated raw cashew nut oil, furfural alcohol resin and liquid phenolic resin.

3. The method of claim 1, wherein said resin curing agent is hexamethylene tetramine.

4. The method of claim 1 wherein said vulcanizing agent for said rubber is sulfur.

5. The method of claim 1 wherein said inorganic filler with said first surface area is selected from the group consisting of clay, red iron oxide, carbon black and combinations thereof.

6. The method of claim 1 further comprising adding a stiffening agent for said bonding materials.

7. The method of claim 6 wherein said stiffening agent is zinc oxide.

8. A method for manufacturing a friction brake shoe composition pre-form of a bonding matrix free of volatile solvent additions and having friction fillers and reinforcing fibers uniformly dispersed in said matrix, said method comprising:

providing at least one inorganic filler with first surface areas selected from the group consisting of clay, red iron oxide and carbon black;

providing as bonding matrix materials in the absence of said volatile solvent additions, a first quantity of a blend of an uncured highly polymerized cashew nut oil resin, an acid-treated raw cashew nut oil, a functional amount of a resin curing agent, a second and lesser quantity of styrene butadiene rubber crumbs and, a functional amount of a vulcanizing agent for said rubber;

mixing said first quantity and said second quantity in the presence of said at least one first surface area filler to form a fluid paste;

providing at least one filler with second surface areas less than said first surface areas, said second surface area filler selected from the group consisting of aluminum silicate, coke fines and graphite, and providing reinforcing fibers selected from the group consisting of glass fibers and aramid fibers;

adding said second surface area filler and said reinforcing fibers to said fluid paste;

continuing said mixing of said fluid paste, first and second area fillers, and said reinforcing fibers to form a uniform dispersion, said acid-treated raw cashew nut oil operable as a reactive diluent to provide sufficient fluidity to said fluid paste for wetting said fibers and fillers; and compressing and shaping a portion of said uniform dispersion to form a briquette-like pre-form of a friction composition.

9. A method for manufacturing railroad brake shoes of a composition material, which has bonding materials with fillers and reinforcing fibers, and is prepared in the absence of a volatile solvent addition to the composition shoe material, said method comprising:

providing at least one inorganic filler with first surface areas, a first quantity of a bonding matrix material of an uncured highly polymerized cashew nut oil resin:

an acid-treated raw cashew nut oil, a functional amount of a resin curing agent, a second and lesser quantity of styrene butadiene crumbs along with a functional amount of a vulcanizing agent for said rubber;

mixing initially said first and second quantities in the presence of said at least one first surface area filler ingredient to form a fluid paste with a consistency to accept dispersion of said fillers and fibers without damage to the structures thereof;

providing at least one filler with second surface areas less than said one inorganic filler first surface areas;

then adding said at least one second surface area filler and reinforcing fibers to said fluid paste;

continuing mixing of said fluid paste, fillers and reinforcing fibers to produce a uniform dispersion, said reactive diluent operable to provide sufficient fluidity to said fluid paste for wetting of said fibers and fillers;

providing a brake backing plate;

shaping said uniform dispersion material to said brake backing plate; and, applying heat and pressure to said uniform dispersion composition material to effect curing of said bonding matrix material and to adhere the composition material to said backing plate.

* * * * *